(12) United States Patent
Abker et al.

(10) Patent No.: US 10,247,484 B2
(45) Date of Patent: Apr. 2, 2019

(54) HEAD CONDENSER

(71) Applicant: GEA Ecoflex GmbH, Duisburg (DE)

(72) Inventors: Gerd Abker, Marl (DE); Bernd Müller, Ratingen (DE); Markus Lentz, Grevenbroich (DE); Dirk Kux, Ratingen (DE)

(73) Assignee: Kelvion PHE GmbH, Sarstedt (DE)

( * ) Notice: Subject to any disclaimer, the term of this patent is extended or adjusted under 35 U.S.C. 154(b) by 553 days.

(21) Appl. No.: 14/481,926

(22) Filed: Sep. 10, 2014

(65) Prior Publication Data

US 2015/0129185 A1 May 14, 2015

(30) Foreign Application Priority Data

Sep. 10, 2013 (EP) ..................................... 13183679

(51) Int. Cl.
| | | |
|---|---|---|
| *B01D 5/00* | (2006.01) | |
| *F28D 9/00* | (2006.01) | |
| *F28F 17/00* | (2006.01) | |
| *F28D 21/00* | (2006.01) | |

(52) U.S. Cl.
CPC .......... *F28D 9/0006* (2013.01); *B01D 5/0015* (2013.01); *B01D 5/0063* (2013.01); *F28F 17/005* (2013.01); *F28D 2021/0038* (2013.01)

(58) Field of Classification Search
CPC .................................................. F28D 9/0006
See application file for complete search history.

(56) References Cited

U.S. PATENT DOCUMENTS

| | | | | |
|---|---|---|---|---|
| 3,540,531 A | | 11/1970 | Rudolf Becker | |
| 3,720,071 A | * | 3/1973 | Nasser ................. | B01D 5/0012 165/166 |
| 3,759,322 A | * | 9/1973 | Nasser ....................... | F25J 5/00 165/166 |
| 4,124,069 A | | 11/1978 | Becker | |
| 5,507,356 A | * | 4/1996 | Roth ........................ | B01D 3/14 165/111 |
| 6,918,433 B2 | * | 7/2005 | Kontu ....................... | F28F 9/22 165/135 |

(Continued)

FOREIGN PATENT DOCUMENTS

| | | | | |
|---|---|---|---|---|
| DE | 30 01 709 | 7/1981 | | |
| DE | 10 2007 031 766 A1 | 2/2008 | | |
| WO | WO 2010149858 A1 | * | 12/2010 | ........... F28D 9/0006 |

*Primary Examiner* — Jianying Atkisson
*Assistant Examiner* — Paul Schwarzenberg
(74) *Attorney, Agent, or Firm* — Gudrun E. Huckett

(57) ABSTRACT

A head condenser is provided with a plate heat exchanger which has first and second channels through which media can flow and which, for the first medium, form tubes between individual plates that are connected to each other to form a pair of plates and, for the second medium, form waves between pairs of plates that are connected to each other to form a stack of plates. A condenser housing is provided in which the plate heat exchanger is arranged, wherein the condenser housing provides pressure chambers which extend over the large outer surfaces of the plate heat exchanger and are in fluidic connection with the channels for the first or second medium. The pressure chambers are traversed by fluid lines which are in fluidic connection with the respectively other first or second medium.

5 Claims, 4 Drawing Sheets

(56) References Cited

U.S. PATENT DOCUMENTS

2009/0321057 A1* 12/2009 Daly .................... B01D 5/0012
                                                        165/111
2010/0276128 A1* 11/2010 Taylor ................... F28D 9/0006
                                                        165/157
2011/0127010 A1*  6/2011 Marold ................ B01D 5/0015
                                                        165/104.21

* cited by examiner

HEAD CONDENSER

BACKGROUND OF THE INVENTION

The invention relates to a head condenser comprising a plate heat exchanger.

Head condensers are known in themselves from the state of the art, for which reason no special reference has to be made to prior publications here.

Head condensers are mounted at the head, i.e. at the end of a column. They serve to dry a gas that is leaving the column by condensing out a product, typically water, by means of the plate heat exchanger provided by the head condenser. Herein, the plate heat exchanger can be operated in cross-current, counter-current or continuous current.

A typical column that is known from the state of the art provides a flow channel formed in a column housing, wherein the column housing is mostly oriented in the vertical direction. At the one end, the flow channel provided by the column housing is supplied with a first medium and at the other end with a second medium. The two media get into direct contact while flowing in counter-current within the column.

Columns are for example typically used for the natural gas purification. In this case, the gas to be purified flows through the column from bottom to top. Water serves as purification medium that is supplied to the column at the other end. The natural gas to be purified as well as the water that serves as purification medium get into direct contact within the column, which leads to filtering out certain components of the natural gas to be purified. Herein, the natural gas to be purified flows through the vertically oriented column housing from bottom to top, whereas the water that serves as purification medium is introduced into the column from the top and thus flows through the column housing from top to bottom.

After having flown through the column, the purified gas gets into the head condenser mounted at the head of the column, in which head condenser the gas is dried by condensing out the water that has been carried along from the purification in the column.

There is a continuous endeavor to provide head condensers which have a small and compact design with simultaneously a high efficiency.

From the state of the art head condensers have been known which comprise tube bundle heat exchangers. However, these ones are comparatively inefficient, since only a reduced heat transfer per surface unit is achieved, which leads to an altogether large construction. In order to overcome this disadvantage, head condensers have furthermore become known from the state of the art, which comprise plate heat exchangers which are spiral-shaped. Such plate heat exchangers are more efficient with respect to tube bundle heat exchangers. But their construction is still comparatively compact, for which reason improvements are also in so far desired.

It is the object of the invention to propose a head condenser which is more efficient while simultaneously comprising a minimized size in comparison to the constructions known from the state of the art.

SUMMARY OF THE INVENTION

For achieving this aim, the invention proposes a head condenser having a plate heat exchanger which comprises first and second channels through which media can flow and which, for the first medium, form tubes between individual plates that are connected to each other to form a pair of plates and, for the second medium, form waves between pairs of plates that are connected to each other to form a stack of plates, and comprising a condenser housing in which the plate heat exchanger is arranged, wherein the condenser housing provides pressure chambers which extend over the large outer surfaces of the plate heat exchanger and are in fluidic connection with the channels for the first or second medium, wherein the pressure chambers are traversed by fluid lines which are in fluidic connection with the respectively other first or second medium.

The head condenser according to the invention comprises a plate heat exchanger that has a tube side on the one hand and a wave side on the other hand. Herein, either the tube side or the wave side of the plate heat exchanger can be connected to the gas outlet of the column. It is however preferred to connect the tube side to the column, in which case the gas that leaves the column flows as first medium into the tubular channels of the plate heat exchanger and accordingly the pressure chambers that extend over the large outer surfaces of the plate heat exchanger are in fluidic connection with the channels for the second medium.

Although the head condenser is mounted on the head of the column, the gas that leaves the column is not directly introduced into the plate heat exchanger. The reason for this is that generated condensate inside the plate heat exchanger would flow back due to gravity and would thus obstruct the entry of the following gas. For this reason, the gas leaving the column is first conducted around the plate heat exchanger, such that the gas can enter the plate heat exchanger on the other side of the column from the top. For this purpose, corresponding fluid lines are provided which traverse the pressure chambers that are formed on both sides of the plate heat exchanger.

The use of a plate heat exchanger equipped with a wave side on the one hand and a tube side on the other hand proves to be advantageous in particular for reasons of efficiency. Herein, the wave side of the plate heat exchanger is preferably supplied with a cooling medium which can be for example water. This one is conducted with increased pressure through the plate heat exchanger, which in the end results in a pressure difference that acts upon the plate heat exchanger. This can disadvantageously cause the individual plates of the heat exchanger to bulge, in particular since the individual plates are only connected to each other at the edges. In order to prevent this, the construction according to the invention provides pressure chambers which extend over the large outer surfaces of the plate heat exchanger. Herein, the pressure chambers are in fluidic connection with those channels of the plate heat exchanger through which the coolant under pressure is conducted. This is preferably the second medium that has been introduced into the plate heat exchanger on the wave side, but if the plate heat exchanger has been installed offset by 90°, it can also be the first medium that flows into this one on the tube side. It is however of essential importance for the invention that thanks to the pressure chambers provided according to the invention, pressure equalization between the inner and the outer pressure takes place, the plate condenser is thus quasi depressurized and only the differential pressure between the tube and the wave side is applied to the plate packet. As a result of the pressure equalization a supporting pressure is formed inside the pressure chambers, which supporting pressure acts as counter-pressure on the plate heat exchanger under pressure.

The construction according to the invention proves to be very compact with respect to its structural dimensions.

Captive pressure plates and/or means of that kind for stabilizing the plate heat exchanger can be omitted respectively the wall thicknesses and the use of materials related thereto can be clearly reduced, which reduces the costs and furthermore simplifies the assembly or disassembly. Furthermore, it becomes possible to make use of a highly efficient plate heat exchanger, such that the compact construction with a simultaneous increase of the efficiency is achieved.

The design according to the invention furthermore proves to be very flexible with respect to its configuration. Thus, the plate heat exchanger can be inserted into the condenser housing such that the first medium, i.e. the medium that leaves the column, flows through the plate heat exchanger on the tube side. On the other hand, the plate heat exchanger can also be turned by 90° with respect to this orientation and be inserted like this in the condenser housing, in which case the medium that leaves the column flows into the plate heat exchanger on the wave side. The compact structure achieved by the design according to the invention allows this flexibility.

The used plate heat exchanger with its wave passages on the one hand and its tube passages on the other hand proves to be extremely efficient with respect to the heat transfer. Thanks to the supporting pressure that is obtained by the design according to the invention it is furthermore possible to select a comparatively small wall thickness of the individual plates of the plate heat exchanger which is about 0.8 mm. As a result, a still further optimized heat transfer capacity can be provided.

According to a preferred embodiment of the invention it is provided that the pressure chambers are divided into areas, so called pressure chamber areas. Herein, it is preferred to form two of such pressure chamber areas. From the point of view of construction this can be for example achieved by means of two separating metal sheets, wherein one of such separating metal sheets is provided for each pressure chamber. Thus, a division of the respective pressure chamber into two areas is obtained. The division of the pressure chambers into pressure chamber areas allows different embodiments.

According to a first embodiment it is provided that the pressure chamber areas are in fluidic connection. This is preferably realized by means of a corresponding deflection, such that as a result a fluidic series connection of the pressure chamber areas is obtained. This embodiment allows operating the head condenser in crossflow counter-current, i.e. the medium flowing through the pressure chambers is conducted in crossflow counter-current with respect to the other medium through the pressure chambers, deflected because of the division into areas and returned into the opposite direction within the pressure chambers, such that not only a crossflow, but a crossflow counter-current is generated. The head condenser can thus be operated with clear temperature overlapping between the hot and the cold side, which is impossible with a pure cross current.

Depending on the arrangement and the orientation of the plate packets in the pressure chamber, the deflection of the medium flowing through the pressure chambers can be provided for both the tube side and the wave side. On the whole, the effective temperature difference can thereby be clearly improved, which leads to more compactness of the overall design of the head condenser.

According to a second embodiment, the pressure chamber areas are fluidically connected in parallel, wherein an individual medium supply and an individual medium discharge are respectively assigned to each area. According to this embodiment, the head condenser can be operated with different cooling media, wherein a particular cooling medium can be provided for each pressure chamber area. In case of a preferred division of the pressure chambers into two pressure chamber areas it is thus possible to use two different cooling media. Herein, the different cooling media can be operated on different temperature levels, such that the effective temperature difference can also be clearly improved according to this embodiment.

According to another embodiment it is also possible to realize a phase change on the cooling side, which means that the cold medium is completely or partially vaporized, whereas on the hot side the medium that flows out of the column is cooled down or partially or completely condensed.

According to another feature of the invention it is provided in view of a pressure tight seal of the pressure chambers that the top and bottom sides, in the direction of height, of the pressure chambers are closed in a fluid tight manner by means of corresponding metal sheets. These metal sheets are traversed by the fluid lines of the respectively other medium, wherein it is preferably provided to weld the fluid lines with the sealing metal sheets, whereby a fluid tight seal or a separation between the respective media is achieved.

BRIEF DESCRIPTION OF THE DRAWINGS

Other features and advantages of the invention will become apparent from the following description by means of the figures.

DESCRIPTION OF PREFERRED EMBODIMENTS

Figure 1:
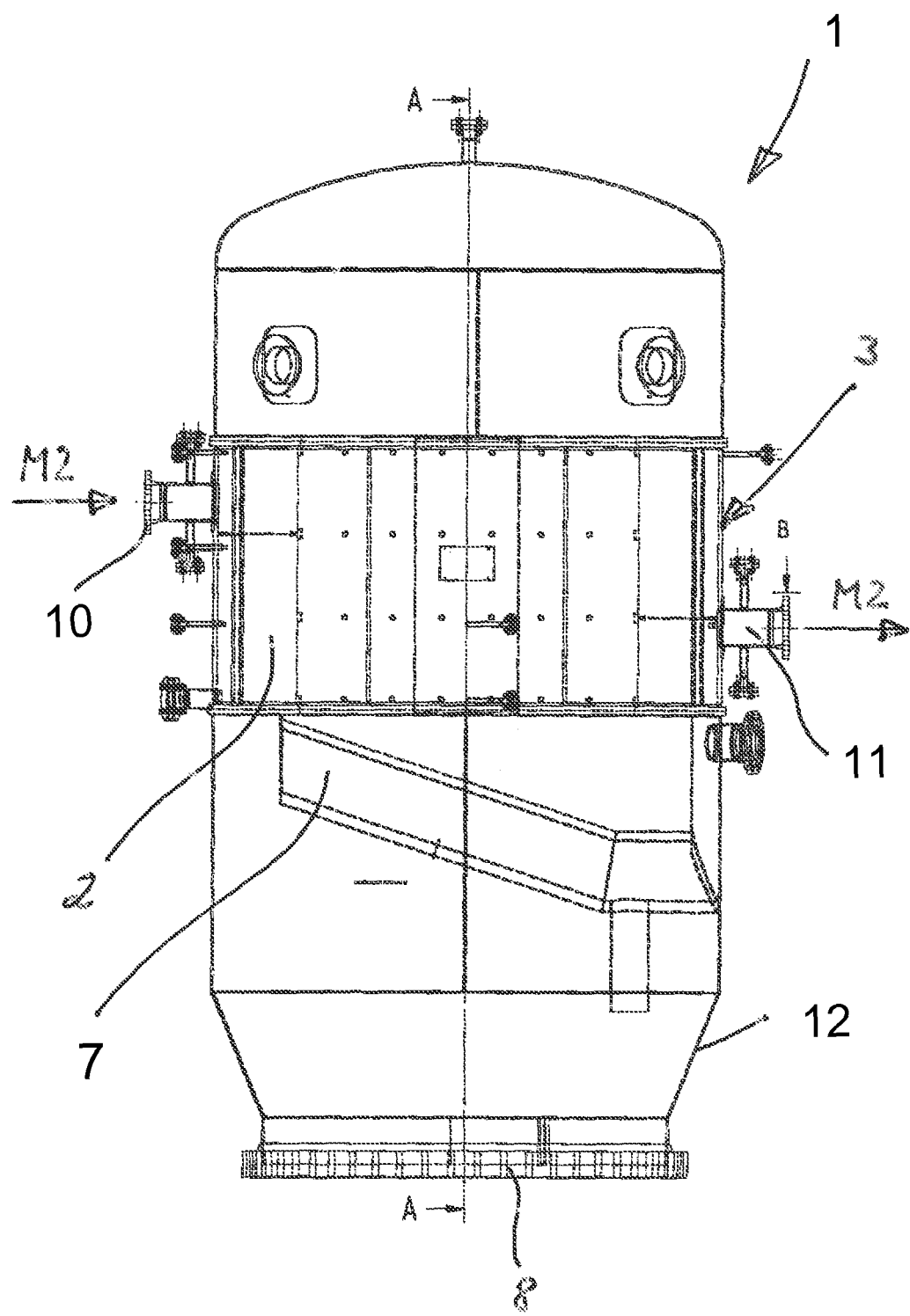
FIG. 1 is a partially cut side view of the head condenser according to the invention.

FIG. 1 is a partially cut side view that shows the head condenser 1 according to the invention in the embodiment comprising a plate heat exchanger. The head condenser comprises a housing 3 that has a cylindrical cross section and comprises a cylindrical shell 12 and is closed on the bottom side by a flange 8. In the finally assembled state, the head condenser 1 is placed with its flange 8 on the top of a column that is not further represented in the figures.

The head condenser 1 comprises a plate heat exchanger 2. This one is disposed inside the condenser housing 3.

The plate heat exchanger 2 comprises first and second channels through which media can flow. Herein, the channels of the first medium M1 form tubes between individual plates that are connected to each other to form a pair of plates. The channels of the second medium M2 are wave-shaped and are placed between pairs of plates that are connected to each other to form a stack of plates. The individual plates as well as the pairs of plates are not represented in detail in the figures.

Figure 2:
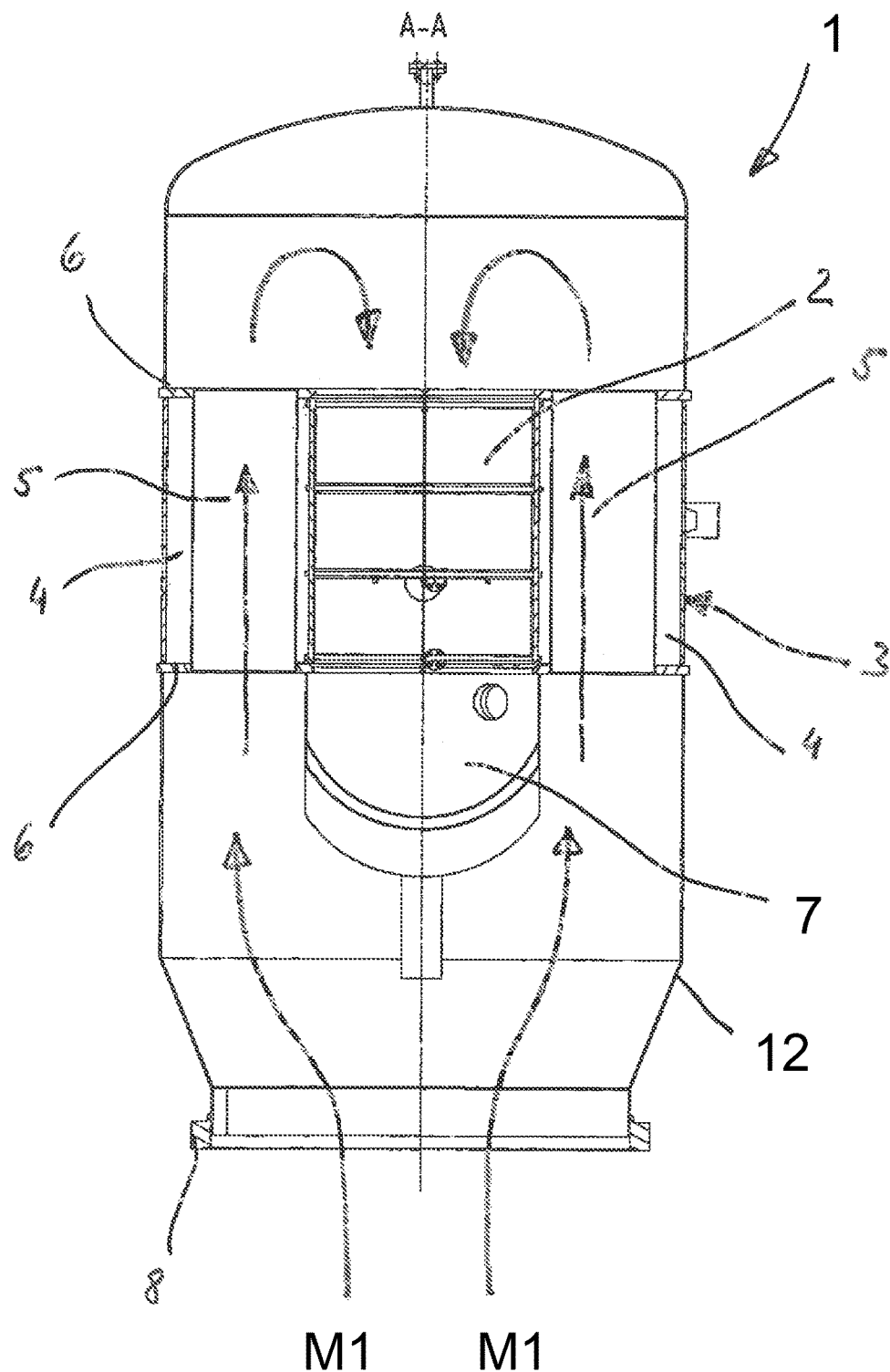
FIG. 2 is a partially cut side view of the head condenser according to the invention according to the cutting line A-A of FIG. 1.
Figure 3:
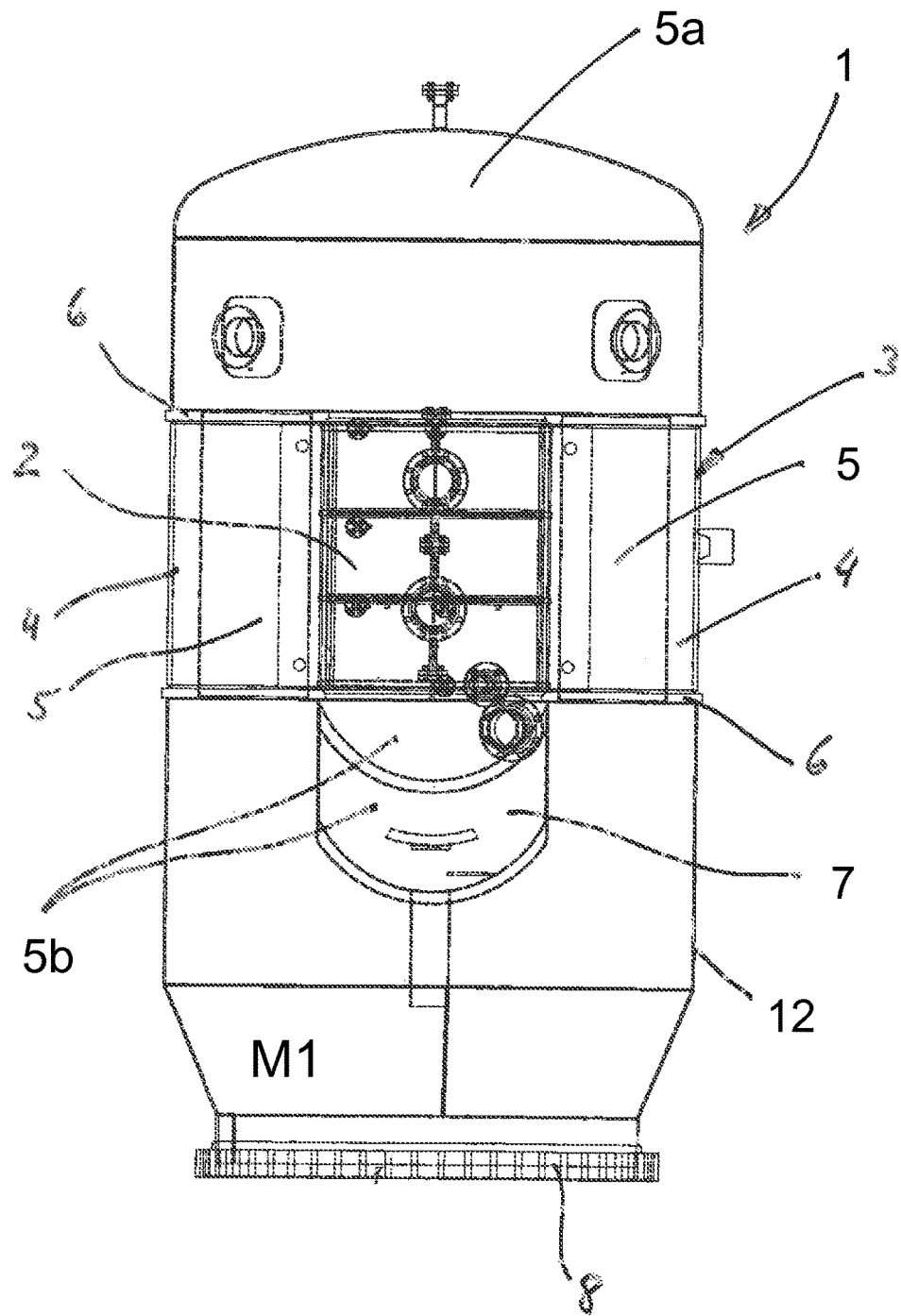
FIG. 3 is also a partially cut side view of the head condenser according to the invention of FIG. 1.
Figure 4:
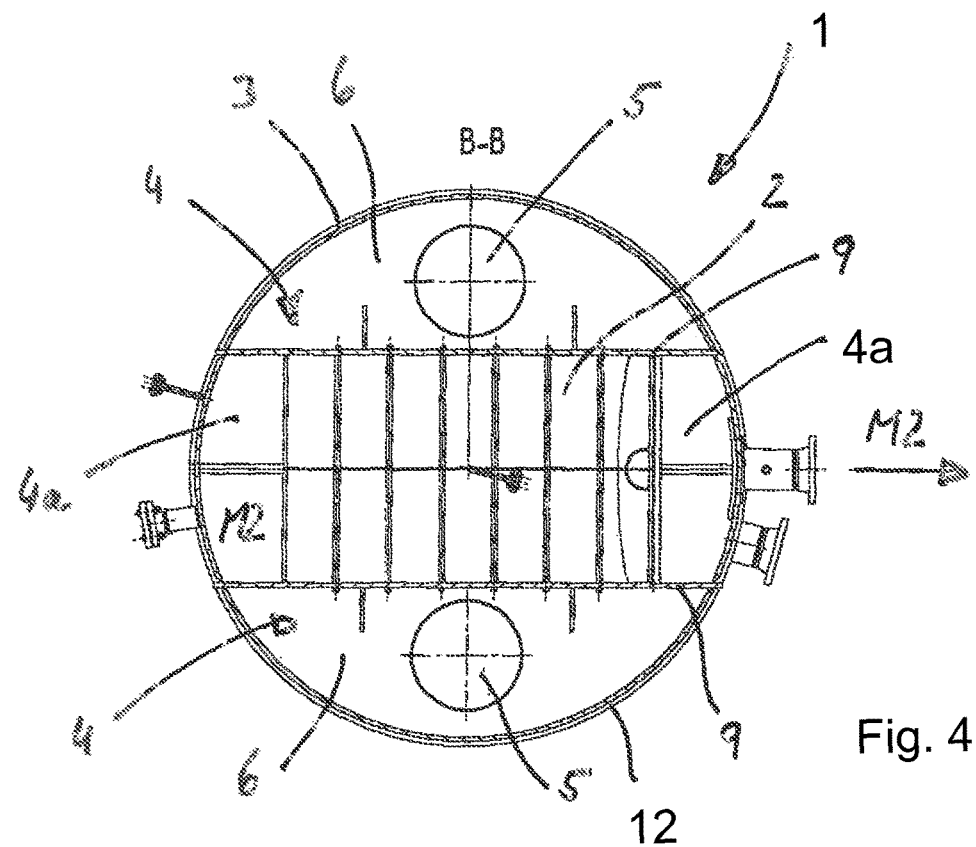
FIG. 4 is a cut top view from above of the head condenser according to the invention according to cutting line B-B of FIG. 1.
Figure 5:
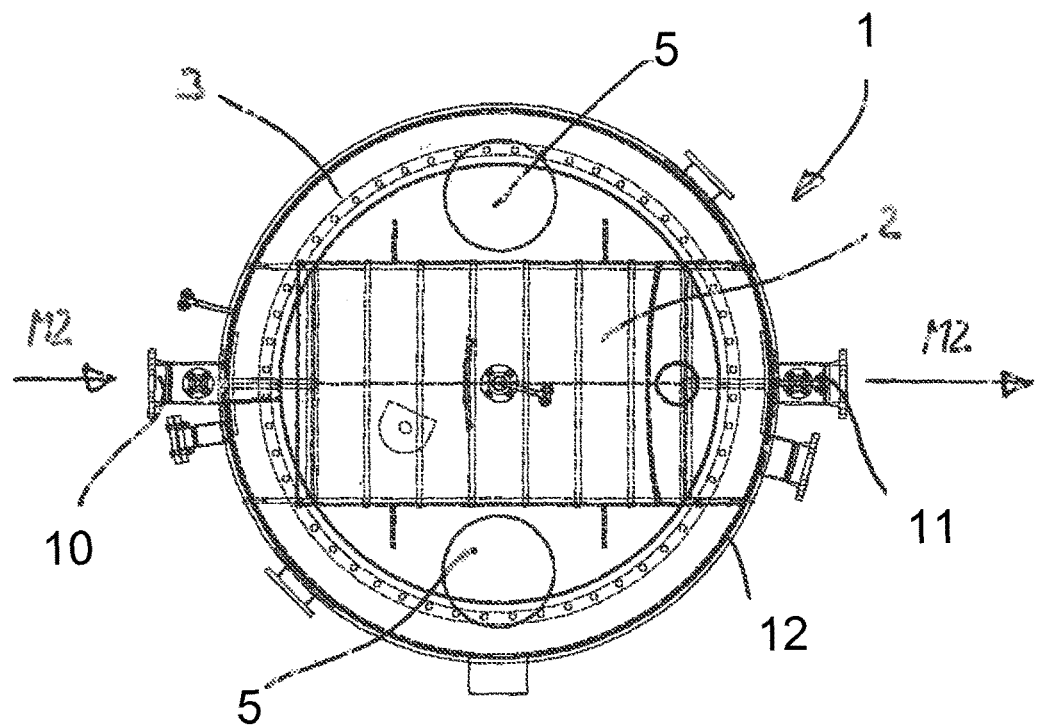
FIG. 5 is also a cut top view from above of the head condenser according to the invention of FIG. 1.

As it is in particular visible when looking together at FIGS. 2 and 4, the condenser housing 3 provides two pressure chambers 4 which extend over the large outer surfaces of the plate heat exchanger 2. With respect to the drawing plane according to FIG. 2, a first pressure chamber 4 is placed on the left side of the plate heat exchanger 2 and a second pressure chamber 4 is placed on the right side of the plate heat exchanger 2. As it is in this context in particular visible in FIG. 4, the pressure chambers 4 are formed in that metal sheets 9 which form walls are inserted into the condenser housing 3, which metal sheets divide the volume space provided by the condenser housing 3 at the height of installation of the plate heat exchanger 2 into an installation space 4*a* for the plate heat exchanger 2, on the one hand, and two adjacent pressure chambers 4, on the other hand, wherein the pressure chambers 4 and the installation space 4*a* are in pressure balance. In the direction of height, the top and bottom sides of the pressure chambers 4 are closed in a fluid-tight manner by means of corresponding metal sheets 6. Thus, pressure chambers 4 are formed which are each adjacent to the plate heat exchanger 2 and comprise a part-circle-shaped cross section design, which fact is in particular visible in the representation according to FIG. 4.

The pressure chambers 4 are connected to a medium supply as well as to a medium discharge, for which purpose corresponding connection flanges 10 and 11 are provided.

In the shown exemplary embodiment, the plate heat exchanger 2 is oriented with the tube side towards a column that is not further represented in the figures. The medium M2 flowing through the connection flanges 10 and 11 will thus flow on the wave side of the plate heat exchanger 2 through this one. Herein, according to the representation of FIG. 1, the second medium M2 flows into the first pressure chamber 4 via the connection flange 10, passes through the plate heat exchanger 2 on the wave side, flows through the second pressure chamber 4 adjacent to this one and leaves the head condenser 1 again via the connection pipe 11.

As it is in particular visible when looking together at FIGS. 2 and 4, the pressure chambers 4 are each traversed, in the direction of height, by a fluid line 5 which are formed as pipe sockets in the shown exemplary embodiment. If used as intended, the first medium M1 coming from a column gets into the head condenser 1 in accordance with the arrows plotted in FIG. 2. Herein, the medium flows through the volume space 5*a* that is, in the direction of height, formed beneath the plate heat exchanger 2, flows through the fluid lines 5 which traverse the pressure chambers 4 and is thus conducted into a volume space 5*a* which is placed, with reference to the direction of height of the head condenser 1, above the plate heat exchanger 2. From here, the first medium M1 flows into the plate heat exchanger 2 on the pipe side in accordance with the arrows plotted in FIG. 2.

A collecting channel 7 for collecting condensate that is formed during operation is provided, with respect to the direction of height, beneath the plate heat exchanger 2. The condensate drips off from the plate heat exchanger 2, is collected by a condensate collector 5*b* of the collecting channel 7 and then evacuated.

The functioning of the head condenser 1 according to the invention is the following:

The hot gas leaving a column is introduced into the head condenser 1 as first medium M1, in accordance with the arrows plotted in FIG. 2. The medium M1 is conducted around the plate heat exchanger 2 by means of the fluid lines 5 provided according to the invention and introduced into this one from above.

A cooling medium is conducted as second medium M2 in crossflow. This medium flows through the connection flange 10 into the first pressure chamber 4 that is provided by the condenser. From there, it is conducted over the wave side of the plate heat exchanger 2 and then gets into the pressure chamber 4 that is provided on the other side of the plate heat exchanger 2. From here, the second medium M2 is discharged via the connection pipe 11.

As a result of the above described flow of the medium through the plate heat exchanger 2, the first medium M1 will cool down inside the plate heat exchanger and a subsequent condensation will take place. Due to gravity, the formed condensate will drip downwards with respect to the direction of height of the head condenser 1 and out of the plate heat exchanger 2 and will be collected by the collection channel 7 after having left the plate heat exchanger 2 and be evacuated.

It is a special advantage of the above described construction that a plate heat exchanger 2 can be used as heat exchanger, which plate heat exchanger is much more energy-efficient with respect to the known pipe-bundle heat exchangers and/or spiral plate heat exchangers. Herein, the use of an above described plate heat exchanger 2 becomes possible because of the pressure chambers 4 provided according to the invention. These ones ensure pressure equalization between the inner and outer pressure, whereby the plate heat exchanger 2 is thus quasi depressurized and only the differential pressure between the tube and the wave side acts within the plate packet. As a result a very compact construction is achieved. Captive pressure plates and/or means of that kind for stabilizing the plate heat exchanger can be omitted respectively the wall thicknesses and the use of materials related thereto can be clearly reduced, which reduces the costs, on the one hand, and allows a simplified assembly or disassembly, on the other hand. Depending on the desired configuration, it is possible to couple either the tube side or the wave side of the plate heat exchanger to a column.

The pressure chambers 4 and the chamber 4*a* are in pressure balance and located at the height of the plate heat exchanger 2. Only the pressure chamber 4*a* is relevant from the fluidic point of view and can be equipped with baffles. Thanks to the pressure balance between the pressure chambers 4 and 4*a*, an equal pressure load on the cylindrical shell 12 is achieved respectively only the differential pressure is applied to the plate packet of the plate heat exchanger 2. The medium M2 is thus located in the pressure chamber 4*a* or in the dead space 4 which is connected by the pressure balance. The medium M1 flowing out of the column is located in the pressure chambers 5*a* above and beneath the plate heat exchanger 2, in the condensate collector 5*b* and in the described fluid line 5.

According to an alternative embodiment, the pressure chambers 4 can be divided into individual pressure chamber areas by means of corresponding separating metal sheets. According to a first alternative, these areas can be fluidically connected to each other, or according to a second alternative, they can be fluidically decoupled, i.e. be connected in parallel. According to the first alternative, a multiple passage of the cooling medium can be realized by means of corresponding deflections, such that during intended use a cross counter-current instead of a simple cross-current is obtained. According to a second alternative, cooling media that are separated from each other, i.e. two or more media M2, can be used, wherein these media can differ from each other with respect to the aggregate state and/or the temperature.

Both above described alternatives allow obtaining more effective temperature differences and/or setting different temperature levels, such that clearer temperature overlappings between the hot and the cold side can be set with the result of an increase in efficiency.

The specification incorporates by reference the entire disclosure of European priority document 13 183 679.3 having a filing date of Sep. 10, 2013.

While specific embodiments of the invention have been shown and described in detail to illustrate the inventive principles, it will be understood that the invention may be embodied otherwise without departing from such principles.

LIST OF REFERENCE NUMERALS 1 head condenser
2 plate heat exchanger
3 condenser housing
4 pressure chamber
4a Installation space
5 fluid line
5a volume space
6 metal sheet
7 collecting channel
8 flange
9 metal sheet
10 connection flange
11 connection flange

What is claimed is:

1. A head condenser comprising a plate heat exchanger (2) which comprises first and second channels through which media can flow and which, for a first medium (M1), form tubes between individual plates that are connected to each other to form a pair of plates and, for a second medium (M2), form waves between pairs of plates that are connected to each other to form a stack of plates, and comprising a condenser housing (3) in which the plate heat exchanger (2) is arranged, wherein the condenser housing (3) provides two pressure chambers (4) which are formed on both sides of the plate heat exchanger (2), wherein a first pressure chamber (4) extends over a first large outer surface of the plate heat exchanger (2) and wherein a second pressure chamber (4) extends over a second large outer surface of the plate heat exchanger (2), wherein the first and second pressure chambers (4) are in fluidic connection with the channels through which the second medium (M2), which is a coolant under pressure, is conducted and are connected to a medium supply formed by a first connection flange (10) and to a medium discharge formed by a second connection flange (11), thus defining a flow path for the second medium (M2) which allows the second medium (M2) to flow into the first pressure chamber (4) via the first connection flange (10), to pass from the first pressure chamber (4) on one side of the plate heat exchanger (2) through the plate heat exchanger (2) on a wave side, to flow from the plate heat exchanger (2) into the second pressure chamber (4) on another side of the plate heat exchanger (2) and to be discharged from the second pressure chamber (4) via the second connection flange (11), wherein the first pressure chamber (4) is traversed by a first fluid line (5) and the second pressure chamber (4) is traversed by a second fluid line (5), wherein the first and second fluid lines (5) are in fluidic connection with the first medium (M1) which is to be condensed.

2. The head condenser according to claim 1, wherein the pressure chamber (4) is divided into preferably two areas by a separating metal sheet.

3. The head condenser according to claim 2, wherein the pressure chamber areas are in fluidic connection.

4. The head condenser according to claim 2, wherein the pressure chamber areas are each connected to a medium supply and a medium discharge.

5. The head condenser according to claim 1, wherein top and bottom sides, in a direction of height, of the pressure chambers (4) are closed in a fluid tight manner by corresponding metal sheets.

* * * * *